Aug. 2, 1960   G. A. MITCHELL   2,947,215
COMPENSATING FILM WARPAGE IN PROJECTORS
Filed March 4, 1957
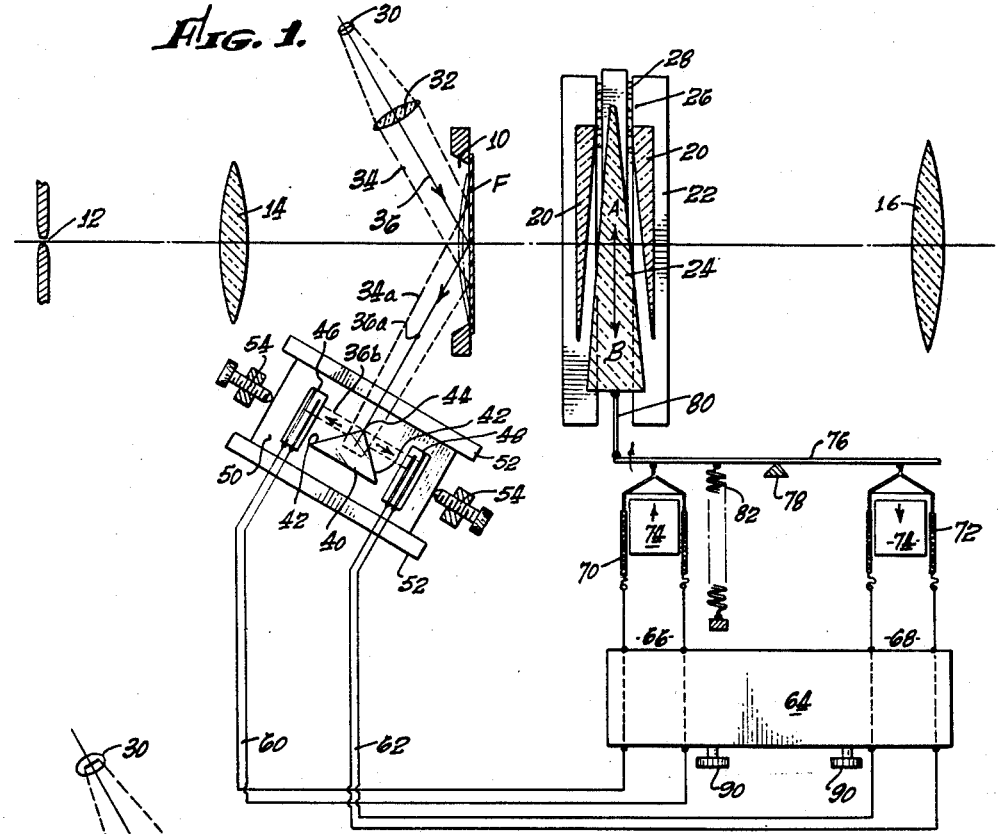
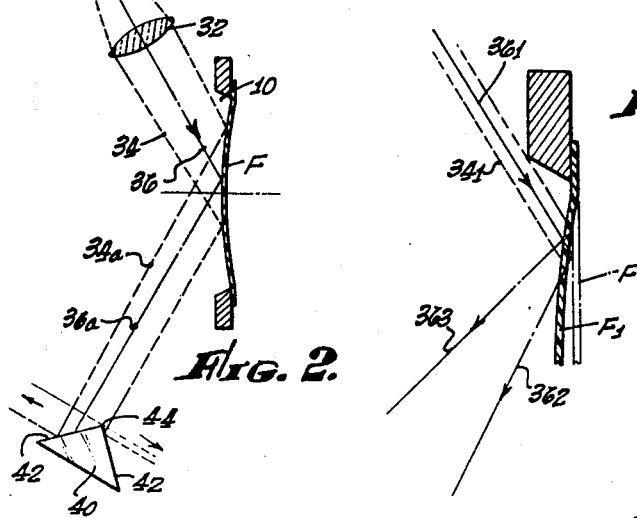
GEORGE A. MITCHELL,
INVENTOR.
BY Bakelew & Lewis United States Patent Office 2,947,215
Patented Aug. 2, 1960

2,947,215

COMPENSATING FILM WARPAGE IN PROJECTORS

George A. Mitchell, 687 Prospect Crescent, Pasadena 3, Calif.

Filed Mar. 4, 1957, Ser. No. 643,657

5 Claims. (Cl. 88—17)

This invention has to do with compensation of film warpage by heat in projectors, to keep a film, that has been displaced by such warpage, as nearly as possible in the focal plane of the projection lens.

Under the intense illumination required in present day projection, a film tends to warp out of its normally flat plane into a curved plane convex on the emulsion side of the film. The major portion of the film area consequently moves out of the focal plane of the projection lens and the projected picture loses sharpness. The warpage effect is most pronounced in wide film under the intense illumination prevalent in motion picture projectors; where the film displacement may be as much as 0.005″ or more. The invention, however, is not limited to motion picture projectors or to any particular width or size of film; as it is equally applicable to any film in any projector.

In general, the invention compensates for the film displacement by automatically shifting the focal plane of the lens to correspond with the film displacement. The shift of the focal plane is preferably effected by varying the effective length of light path through glass interposed in the light beam between the lens and focal plane. That is done by shifting a glass wedge. The shift of the glass wedge is caused by means (preferably an electric circuit means) controlled by a light beam reflected from a face of the film; the shift of the reflected beam controlling the action of the circuitry to correspondingly shift the wedge.

The invention will be more fully understood from the following detailed description of preferred and illustrative embodiments, with reference to the accompanying drawings in which:

Fig. 1 is a diagrammatic showing of one typical and illustrative embodiment;

Fig. 2 is a schematic showing shift of the ray reflected from a warped film; and Fig. 3 is a schematic showing a variation.

In the drawings a film F is shown in position at an exposure aperture 10, illuminated by light from a source 12 with an interposed collector 14. The projection lens is schematically indicated at 16. In normal projection lens 16 is focussed so that its internal focal plane is at the emulsion face of film F in its flat condition, and its external focal plane is on the projection screen (not shown). With the shift of the film from flat (full lines in Fig. 1) to warped condition (dotted lines) the internal focal plane could be shifted by shifting the projection lens. But such lenses are usually large and heavy, and a shift of the projection lens itself will cause a change in size of the image on the screen which in turn may cause an out of focus effect in the projected picture; so it is preferred to shift the internal focal plane by such a glass-path means as here shown. This means may take several different forms; a typical form is shown in Fig. 1.

As there shown two glass wedges 20 are stationarily mounted, as on a mounting base 22 which is stationary in the projector. The outer faces of wedges 20 are mutually parallel; their inner faces converge. Between wedges 20 another but movable wedge 24 is mounted to move back and forth in the directions indicated. It may, for instance, be mounted and guided by ways 26 which may be provided with ball bearings as indicated at 28 to render the movement substantially frictionless. The faces of wedge 24 are parallel to the two inner faces of wedges 20. The whole wedge arrangement is large enough, and is so placed, as to take the whole of the light beam between the film and lens 16. And the arrangement is such that shift of wedge 24 varies the total glass-path, while, for any position of 24 the total length of glass-path over the whole cross-section of the beam is the same. Shift of 24 in direction A increases the length of glass-path and shifts the focal plane to the left in Fig. 1; shift in direction B shifts the focal plane toward the right.

A light source 30 and a lens 32 concentrate a light beam 34 along an axis 36 which is preferably oriented at a small angle to the normal film plane, shown here as about 30°. As shown in Fig. 1, beam axis 36 intersects the normal plane of the film face at, or approximately at, its center. Reflected from that face in normal position, the beam is reflected at 34a along axis 36a and falls on a prism 40 that has two reflective surfaces 42 meeting at an apex 44 to act as a beam splitter. The prism is preferably mounted for position adjustment so that with film F in normal flat condition, beam axis 36a intersects the prism apex and the beam 34a is split into equal parts which are reflected outwardly as at 36b onto two photo-cells 46 and 48. For convenience in adjustment the prism and photo-cells may for example be mounted on a base 50 movable in guides 52 and adjustably settable by screws 54. Light source 30 should be of a type that is of uniform intensity throughout its dimension in the plane of the drawing, so that the beam 34, 34a will be of uniform intensity in that plane. For example, source 30 may be a filament with its length in that plane.

Circuits 60 and 62 feed the voltages raised by photo-cells 46 and 48 to a double amplifier 64. That amplifier for example may consist simply of two linear D.C. amplifiers with outputs at 66 and 68, where the outputs are linearly proportionate to the voltages of the respective cells 46 and 48. Outputs 66 and 68 lead to duplicate movable coils 70 and 72, respectively, which, similar to voice coils of a speaker, surround stationary permanent magnets 74.

Coils 70 and 72 are mechanically connected to opposite ends of a lever 76 pivoted at 78. One end of the lever is connected by link 80 to wedge 24. The arrangement is such that energization of coil 70 tends to move wedge 24 in direction A; while energization of coil 72 tends to move the wedge in direction B. A spring 82 or equivalent may tend, when stressed, to move wedge 24 in direction B.

Referring now more particularly to Fig. 2, the film is there shown warped in its central portions toward the left from its flat position. Due to that displacement the reflected ray 34a is displaced to the left by an amount about twice the film displacement. As the drawing shows, the beam axis 36a is thus displaced to the left of apex 44 of the beam splitter and a larger part of the beam falls on left hand prism face 42 and is reflected to cell 46; a smaller part on right hand face 42 and reflected to cell 48. The cross-sectional size of the reflected beam 34a is such that, with maximum film displacement, the beam never entirely leaves the right face 42. The displacement of the reflected beam is in substantially direct proportion to the film displacement; and the difference between the amounts of light falling on the two reflective faces is directly proportional to the beam displacement. The voltages raised by cells 46 and 48 are linearly related to the amount of light falling on them. Consequently the difference between the voltages applied to coils 70 and 72 is directly proportional to the film displacement.

In normal position, with the film flat, beam 34a is equally split and equal voltages are applied to coils 70 and 72, the coils are symmetrically related to the magnets 74, so that no differential force is applied to prism A to move it. Spring 82 is unstressed. In this condition, lens 16 is focussed on the emulsion face of the flat film. Displacement of the film toward the left increases the force exerted by coil 70 and decreases that of coil 72, moving wedge 24 in direction A. As the coils move with relation to their magnets the resultant differential force may increase at a rate faster than a linear relation to their movement. The characteristics of spring 82 are chosen so that it has substantially that same change of rate, so that the resultant movement of wedge 24 is always substantially directly proportional to the difference in voltages applied to 70 and 72 and to the film displacement. The shift of the focal plane is directly proportional to the movement of wedge 24; consequently the shift of the focal plane toward the left is substantially proportional to the displacement of that part of the film from which beam 34 is reflected. By controllably adjusting the amplification ratios in the amplifiers (adjustment means indicated at 90) those ratios may be adjusted to be equal; and adjusted so that the resultant focal plane displacement is either substantially equal to the displacement of the central part of the film, or somewhat less so as to equal the average displacement of the whole film area.

Spring 82 or equivalent means may not be necessary. If for example the arrangement of the coils and magnets in the magneto-motive elements 70, 74 and 72, 74 is such that, on movement in the directions indicated, the magneto-motive force of 70, 74 decreases while that of 72, 74 increases, an equilibrium position will be reached. If the variations in those forces are made to be linearly related to the movements, then the movement of wedge 24 will again be substantially linearly related to the film displacement.

Fig. 3 schematically illustrates a variational arrangement wherein a relatively narrow light beam 341 is directed on axis 361 onto a portion of the film near its edge. The axial displacement of that film portion is relatively small, but the angle of that portion changes, as indicated, between normal film position F and warped position F1. Due to that change of angle, the axis of the reflected beam is shifted from such an orientation as indicated at 362 to that indicated at 363. The beam shift may then be utilized as in Fig. 1.

It may be noted that the film may not always warp to a smoothly curved configuration such as shown, but may take a somewhat irregular or wavy configuration. However, in any event, warpage is accompanied by general shift of the central or general area of the exposed part of the film, or by angular shift near its edge. In such cases the system still operates to at least substantially compensate a major part of the out-of-focus effect.

In this connection, it will be noted that a fairly large area of the film is preferably impinged by the reflected light beam, so that small irregularities in the warped film conformation are averaged out.

The reflected light beam may be either of visual or non-visual character. Its intensity may be made low enough, compared with the intensity of the projection illumination, as to give no perceptible high lighting of a limited area on the film and screen. On the other hand, non-visual radiation, either ultra-violet or infra-red, may be utilized.

I claim:

1. A system for compensating for film warpage in a projector where the film is illuminated from a light source and is projected by a projection lens with its inner focal plane located at the film plane; said system comprising, means directing a constant light beam onto the film along an axis at an acute angle to the normal film plane to be constantly reflected from the film along an axis whose position changes with changes of film position, constantly operating electro-motive means receiving and constantly responding to changes in position of the reflected beam, and constantly acting means controlled by the electro-motive means and acting to shift the position of the inner focal plane of the projection lens with relation to that lens, whereby the position of the inner focal plane of the lens is shifted with relation to the lens to correspond to changes in film position without accompanying shift of the outer focal plane of the lens.

2. The system defined in claim 1, and in which the reflected light beam is confined to a limited portion of the illuminated film area.

3. The system defined in claim 2, and in which said limited portion is a substantially central portion of the illuminated film area.

4. The system defined in claim 2, and in which the said limited portion is a portion near an edge of the illuminated film area.

5. The system defined in claim 1, and in which the last mentioned means comprises a glass-path element located between the film and the projection lens, and means for varying the effective length of the light path through the glass-path element.

References Cited in the file of this patent

UNITED STATES PATENTS

| 2,011,932 | Ives | Aug. 20, 1935 |
| 2,258,903 | Mitchell | Oct. 14, 1941 |
| 2,304,814 | Glasser | Dec. 15, 1942 |
| 2,339,780 | Huitt | Jan. 25, 1944 |
| 2,563,892 | Waller et al. | Aug. 14, 1951 |

FOREIGN PATENTS

| 914,462 | Germany | July 1, 1954 |
| 1,072,573 | France | Mar. 17, 1954 |

OTHER REFERENCES

Journal of the Optical Society of America, article, Baxter et al., vol. 47, No. 1 (January 1957), pages 76–80.